(12) United States Patent
Wu

(10) Patent No.: US 9,762,586 B2
(45) Date of Patent: Sep. 12, 2017

(54) SYSTEM AND METHOD FOR CONTROLLING MUTUAL ACCESS OF SMART DEVICES

(71) Applicant: SHENZHEN TCL NEW TECHNOLOGY CO., LTD., Guangdong (CN)

(72) Inventor: Max Wu, Guangdong (CN)

(73) Assignee: SHENZHEN TCL NEW TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/785,692

(22) PCT Filed: Jul. 2, 2014

(86) PCT No.: PCT/CN2014/081449
§ 371 (c)(1),
(2) Date: Oct. 20, 2015

(87) PCT Pub. No.: WO2015/074424
PCT Pub. Date: May 28, 2015

(65) Prior Publication Data
US 2016/0072821 A1    Mar. 10, 2016

(30) Foreign Application Priority Data
Nov. 19, 2013   (CN) .......................... 2013 1 0585688

(51) Int. Cl.
*H04L 29/00* (2006.01)
*H04L 29/06* (2006.01)
(Continued)

(52) U.S. Cl.
CPC ........ *H04L 63/102* (2013.01); *H04L 63/0869* (2013.01); *H04L 69/16* (2013.01); *H04W 12/06* (2013.01); *H04W 12/08* (2013.01)

(58) Field of Classification Search
CPC ........... G06K 9/00; H04N 21/44; G06Q 10/08
(Continued)

(56) References Cited

U.S. PATENT DOCUMENTS 8,539,567 B1    9/2013  Logue et al.
9,202,105 B1 *  12/2015 Wang ................. G06Q 20/4014
2015/0088694 A1* 3/2015 Ackerman ........... G06Q 10/087
                                                    705/26.62

FOREIGN PATENT DOCUMENTS

CN    102882769 A    1/2013
CN    103281327 A    9/2013

OTHER PUBLICATIONS

1st Office Action of counterpart Chinese Patent Application No. 201310585688.X dated Dec. 6, 2016.
(Continued)

*Primary Examiner* — Anthony Brown
*Assistant Examiner* — Michael D Anderson

(57) ABSTRACT

The present invention discloses a system and method for controlling mutual access of smart devices. The method includes creating a home account on a cloud server, and adding smart devices and device information corresponding to the smart devices to a device list under the home account; acquiring, for each of the smart devices, authentication by using the home account and device information corresponding to the smart device; and establishing, for each of the smart devices, a Transmission Control Protocol (TCP) long connection to the cloud server. In the present invention, a unique home account is created on a cloud server, so that smart devices log in to the cloud server by using the unified home account, and the smart devices under the unified home account allow mutual access when being authorized. Therefore, when smart devices in a home access each other, the workload is greatly reduced. Moreover, a permission management module is established on the cloud server, which
(Continued)

limits permissions of sending messages between smart devices under a same home account or different home accounts, thereby improving the reliability and security of mutual access of the smart devices.

7 Claims, 4 Drawing Sheets

(51) Int. Cl.
 *H04W 12/08* (2009.01)
 *H04W 12/06* (2009.01)
(58) Field of Classification Search
 USPC .............................................. 726/4
 See application file for complete search history.

(56) References Cited

OTHER PUBLICATIONS

Search Report of counterpart European Patent Application No. 14863586.5 dated Jun. 7, 2017.

\* cited by examiner

# SYSTEM AND METHOD FOR CONTROLLING MUTUAL ACCESS OF SMART DEVICES

BACKGROUND

Technical Field

The present invention relates to the field of smart house appliances, and in particular, to a system and method for controlling mutual access of smart devices.

Related Art

Currently, with the development of science and technologies, networking and smartening of electronic products develop rapidly. From smart phones and tablet computers to smart televisions (TVs) and smart house appliances, various novel networked and smartened electronic products emerge constantly, and bring unprecedented convenience for life of people. In home life, various smart devices may mutually access (that is, the smart devices send request and response messages to each other) and push messages (that is, a requester does not need to send a request in advance, but directly sends a message to a requested device), for example, a computer pushes a video to a TV, the TV sends a control command to another house appliance, the another house appliance sends a state report message to the TV, and the like, and such interaction may greatly improve the experience of a user using various smart devices. In the prior art, generally, the instant messaging (IM) technology is used to enable various smart devices to connect to a same cloud server and mutually access and push messages. However, this manner has the following defects: One home may have many smart devices, and in a current IM system, it is required to apply for a different account for each smart device, and mutual access and message push are allowed only after a friend relationship is established between each two of the smart devices; therefore, the workload for preparation before this interaction manner is used is large. Moreover, in the current IM system, multi-point login is allowed, that is, one account is allowed to log in on different devices, but different devices under a same account are not allowed to push messages to each other, and message push can be performed only after login using different accounts; in addition, in the current IM system, permission control is not performed on mutual access of smart devices, and any message may be sent as long as both parties are in a friend relationship, resulting in that the security cannot be ensured.

SUMMARY

A major objective of the present invention is to provide a system and method for controlling mutual access of smart devices, where a unique home account is established on a cloud server, and smart devices are added under the home account, so that when smart devices in a home access each other, the workload is greatly reduced.

The present invention provides a system for controlling mutual access of smart devices, including a cloud server, where the cloud server includes:

an information processing module, configured to maintain Transmission Control Protocol (TCP) long connections between smart devices and the cloud server, maintain connection sessions between the smart devices, and forward interaction data packets between the smart devices;

an account and device management module, configured to manage registration of a home account, and add smart devices and device information corresponding to the smart devices to a device list under the home account; and a storage module, connected to the account and device management module and the information processing module, and configured to store the registered home account, the device list under the home account, the smart devices and the device information corresponding to the smart devices.

Preferably, the cloud server further includes:

a permission management module, connected to the storage module, and configured to set access permission information corresponding to each of the smart devices.

Preferably, the device information includes access permission information, device types, device identities (IDs), and device notes that correspond to the smart devices.

Preferably, the access permission information corresponding to each of the smart devices includes: allowing receiving and sending a command and request, a list of devices whose authorization is allowed, and an effective time range of authorization.

Preferably, the information processing module includes:

a connection, session management and forwarding unit, configured to maintain the TCP long connections between the smart devices and the cloud server, maintain the connection sessions between the smart devices, and forward the interaction data packets between the smart devices;

an authenticating unit, configured to authenticate legality of the home account and a smart device;

a unit for determining whether a device is online, configured to determine whether the smart device is online; and a permission determining unit, configured to determine whether the smart device has a corresponding access permission.

The present invention further provides a method for controlling mutual access of smart devices, including:

creating a home account on a cloud server, and adding smart devices and device information corresponding to the smart devices to a device list under the home account;

acquiring, for each of the smart devices, authentication by using the home account and device information corresponding to the smart device; and establishing, for each of the smart devices, a TCP long connection to the cloud server.

Preferably, the acquiring, for each of the smart devices, authentication by using the home account and device information corresponding to the smart device includes:

receiving, by the cloud server, an authentication request sent by the smart device, and determining whether the home account and the smart device are legal, where if the home account and the smart device are legal, the smart device returns to the device list.

Preferably, after the determining whether the home account and the smart device are legal, the method further includes:

if the home account and the smart device are illegal, sending, by the cloud server to the smart device, a data packet indicating that the home account or the device information of the smart device is wrong, and ending this authentication.

Preferably, the smart devices in the device list include a first device and a second device, and after the establishing, for each of the smart devices, a TCP long connection to the cloud server, the method further includes:

sending, by the first device, a data packet of requesting to access the second device to the cloud server, and determining, by the cloud server, whether the second device is online; and if the second device is offline, sending, by the cloud server to the first device, a data packet indicating that the second device is offline, and ending this access; or if the second device is online, parsing, by the cloud server, the request data packet, and determining, according to preset permission information, whether the second device allows the first device to send a request corresponding to the request data packet to the second device, and if it is allowed, after forwarding the request data packet to the second device, sending, to the first device, a response data packet returned by the second device, and then ending this access; or if it is not allowed, sending, to the first device, a data packet indicating that the first device has no permission, and ending this access.

Preferably, the adding device information corresponding to the smart devices includes: adding access permission information, device types, device IDs, and device notes that correspond to the smart devices.

Preferably, access permission information corresponding to each of the smart devices includes: allowing receiving and sending a command and request, a list of devices whose authorization is allowed, and an effective time range of authorization.

The method for controlling mutual access of smart devices of the present invention includes creating a home account on a cloud server, and adding smart devices and device information corresponding to the smart devices to a device list under the home account; acquiring, for each of the smart devices, authentication by using the home account and device information corresponding to the smart device; and establishing, for each of the smart devices, a TCP long connection to the cloud server. In the present invention, a unique home account is created on a cloud server, and smart devices are added under the home account, so that the smart devices log in to the cloud server by using the unified home account, and the smart devices under the unified home account allow mutual access when being authorized, thereby avoiding creating a different account for each smart device in a home, and avoiding that mutual access and message push are allowed only after a friend relationship is established between each two of the smart devices, so that when the smart devices in the home access each other, the workload is greatly reduced.

The objective implementation, functional features and advantages of the present invention will be further illustrated with reference to the accompanying drawings by using embodiments.

DETAILED DESCRIPTION

Technical solutions of the present invention are further described with reference to the accompanying drawings of the specification and specific embodiments. It should be understood that the specific embodiments described herein are merely used to explain the present invention, and are not intended to limit the present invention.

The present invention provides a system for controlling mutual access of smart devices.

Figure 1:
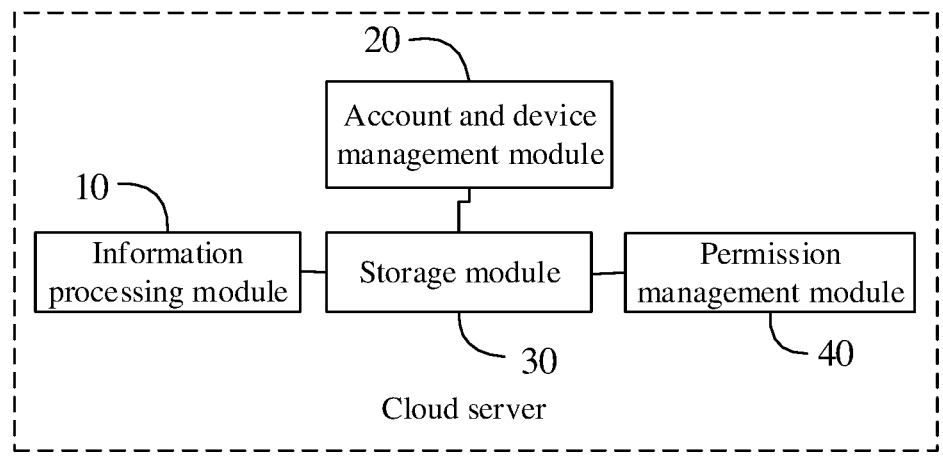
FIG. 1 is a schematic structural diagram of an embodiment of a system for controlling mutual access of smart devices according to the present invention.

Referring to FIG. 1, FIG. 1 is a schematic structural diagram of an embodiment of a system for controlling mutual access of smart devices according to the present invention. The system for controlling mutual access of smart devices in this embodiment includes a cloud server, where the cloud server includes: an information processing module 10, an account and device management module 20, and a storage module 30.

The information processing module 10 is configured to maintain TCP long connections between smart devices and the cloud server, maintain connection sessions between the smart devices, and forward interaction data packets between the smart devices.

The account and device management module 20 is configured to manage registration of a home account, and add smart devices and device information corresponding to the smart devices to a device list under the home account. A user may register the home account by accessing a home account setting page in the account and device management module 20, and perform registration by entering home account information, such as an account name and an account password, thereby obtaining the home account; in this embodiment, during registration of the home account, it is required to enter at least the account name and the account password. After the home account is successfully registered, smart devices may be added under the home account, and device information corresponding to the smart devices under the home account may be further added, where the device information includes device types (TV, tablet computer, mobile phone, air conditioner, refrigerator, washing machine, smart socket, and the like), device IDs (uniquely identifying the smart devices under the home account) and device notes that correspond to the smart devices, for example, an added smart device is a TV in the living room, and then, a device type thereof may be set to: TV, a device ID thereof may be set to: tv1, and a device note thereof may be set to: TV in the living room.

The storage module 30 is connected to the account and device management module 20 and the information processing module 10, and configured to store the registered home account, the device list under the home account, the smart devices and the device information corresponding to the smart devices.

In this embodiment, a unique home account is created on a cloud server, and smart devices are added under the home account, so that the smart devices log in to the cloud server by using the unified home account, and the smart devices under the unified home account allow mutual access when being authorized, thereby avoiding creating a different account for each smart device in a home, and avoiding that mutual access and message push are allowed only after a friend relationship is established between each two of the smart devices, so that when the smart devices in the home access each other, the workload is greatly reduced.

As shown in FIG. 1, the cloud server further includes: a permission management module 40, connected to the storage module 30, and configured to set access permission information corresponding to each of the smart devices. The user may perform permission control on access and message push between the smart devices by using a permission setting page provided by the permission management module; in this embodiment, the access permission information corresponding to each of the smart devices includes allowing receiving and sending a command and request (for example, acquiring device information, sending a control command to a smart device, receiving a push message, sending a push message, and the like), a list of devices whose authorization is allowed, an effective time range of authorization, and the like. In the present invention, in addition to the device types, the device IDs, and the device notes that correspond to the smart devices, the device information further includes access permission information corresponding to the smart devices. In this embodiment, the permission management module is established on the cloud server, which limits permissions of sending messages between smart devices under a same home account, and at the same time, particularly limits permissions of sending messages between smart devices under different home accounts, thereby improving the reliability and security of mutual access of the smart devices.

Figure 2:
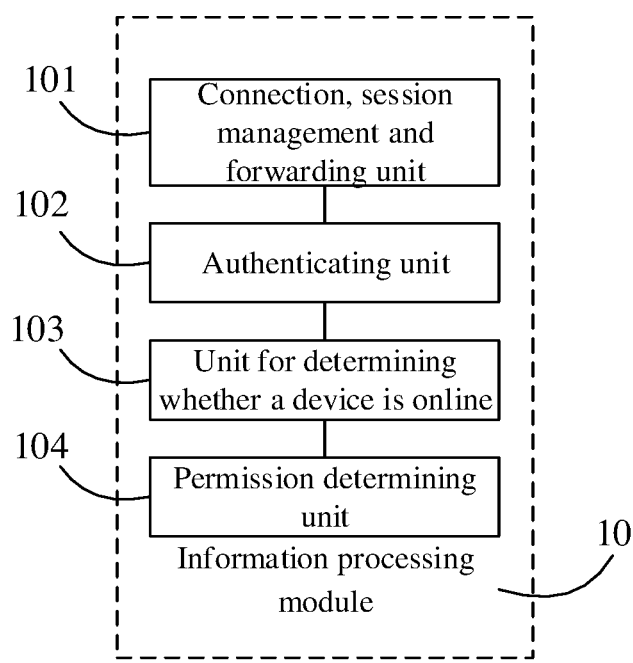
FIG. 2 is a schematic structural diagram of an embodiment of an information processing module according to the present invention.

Further, referring to FIG. 2, FIG. 2 is a schematic structural diagram of an embodiment of an information processing module according to the present invention. The information processing module 10 includes a connection, session management and forwarding unit 101, configured to the maintain TCP long connections between smart devices and the cloud server, maintain the connection sessions between the smart devices, and forward the interaction data packets between the smart devices; an authenticating unit 102, configured to authenticate legality of the home account and a smart device; a unit 103 for determining whether a device is online, configured to determine whether the smart device is online; and a permission determining unit 104, configured to determine whether the smart device has a corresponding access permission. By means of the above units, mutual access of smart devices is further implemented, and the reliability and security are further improved.

The present invention further provides a method for controlling mutual access of smart devices.

Figure 3:
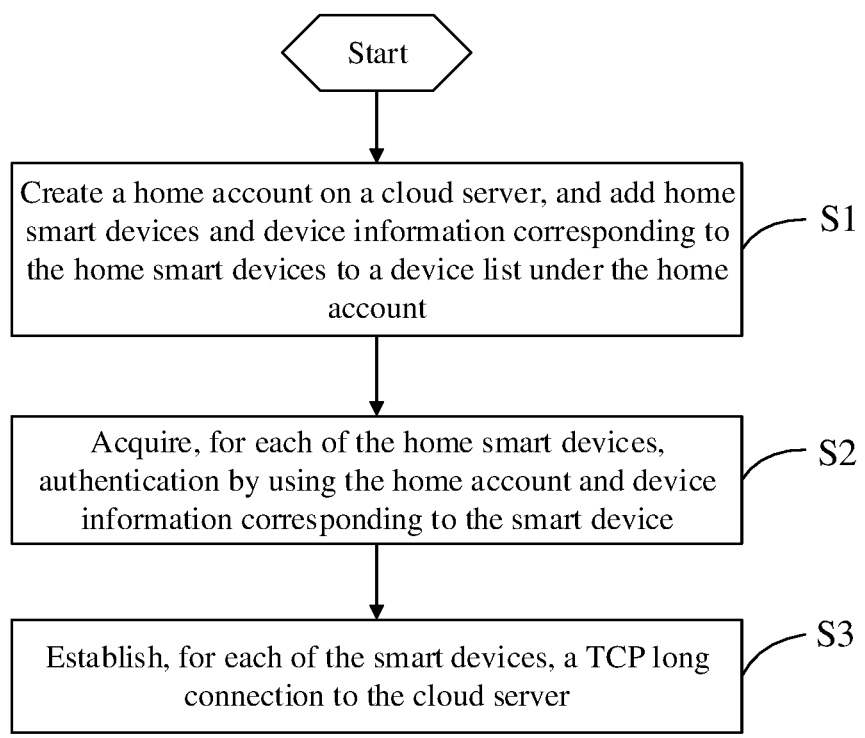
FIG. 3 is a flowchart of an embodiment of a method for controlling mutual access of smart devices according to the present invention.

Referring to FIG. 3, FIG. 3 is a flowchart of an embodiment of a method for controlling mutual access of smart devices according to the present invention. The method for controlling mutual access of smart devices includes:

Step S1: Create a home account on a cloud server, for example, myhome, and add, to a device list under the home account, smart devices such as a TV, a tablet computer, a mobile phone, an air conditioner, a refrigerator, a washing machine, and a smart socket, and device information corresponding to the smart devices, such as access permission information, device types, device IDs, and device notes that correspond to the smart devices.

Step S2: Acquire, for each of the home smart devices, authentication by using the home account and device information corresponding to the smart device. Each of the smart devices is connected to the cloud server by using a "home account device ID". In this embodiment, the created home account is: myhome, and if an added smart device is a TV in the living room, a device type thereof may be set to: TV, a device ID thereof may be set to: tv1, and a device note thereof may be set to: TV in the living room; the smart device is connected to the cloud server by using "myhome\tv1", the home account and a password are authenticated by using the cloud server, and at the same time, it is authenticated whether the device ID exists in the device list. After the authentication succeeds, step S3 is performed: Establish, for each of the smart devices, a TCP long connection to the cloud server. That is, login is completed. A smart device that succeeds in the authentication and has logged in is in an online state; otherwise, it is in an offline state.

Figure 4:
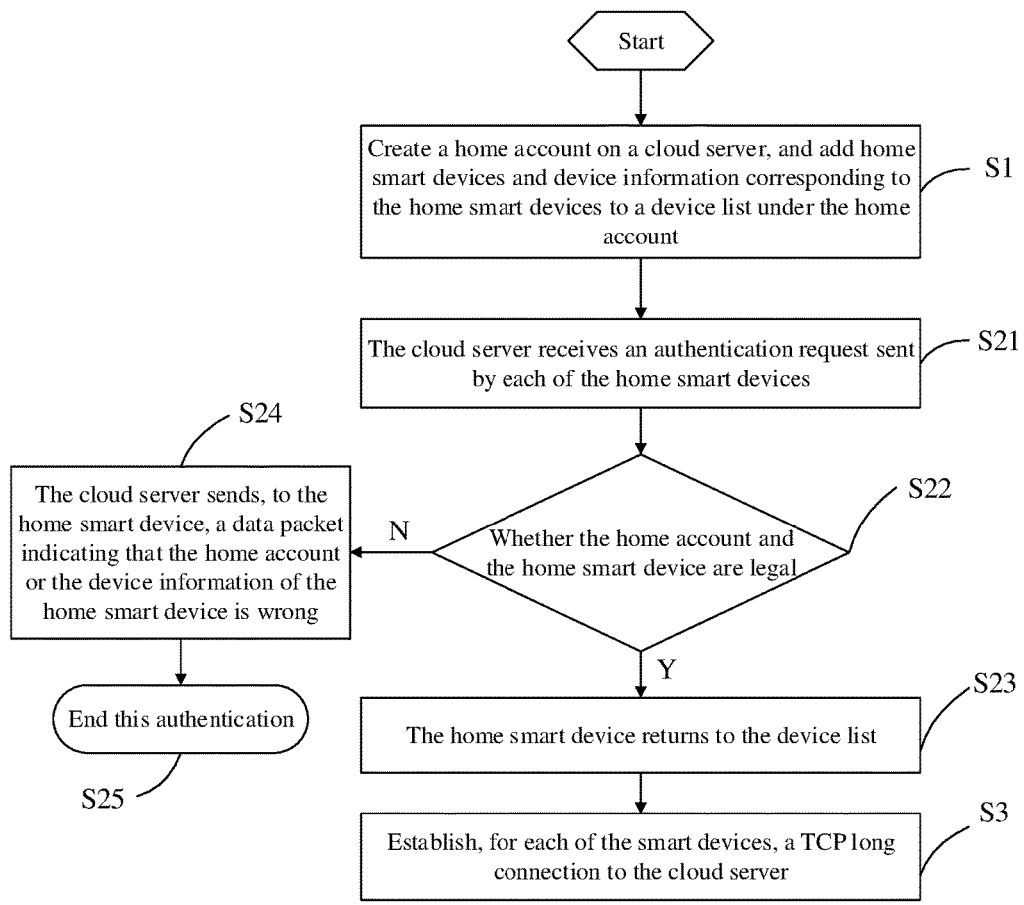
FIG. 4 is a flowchart of another embodiment of a method for controlling mutual access of smart devices according to the present invention.

Further, referring to FIG. 4, FIG. 4 is a flowchart of another embodiment of a method for controlling mutual access of smart devices according to the present invention. The acquiring, for each of the smart devices, authentication by using the home account and device information corresponding to the smart device in step S2 includes:

Step S21: The cloud server receives an authentication request sent by the smart device. Then step S22 is performed: Determine whether the home account and the smart device are legal, where the home account and a password are authenticated by using the cloud server, and at the same time, it is authenticated whether an ID of the device exists in the device list. If the home account and the smart device are legal, step S23 is performed: The smart device returns to the device list. After the authentication succeeds, step S3 is performed: Establish, for each of the smart devices, a TCP long connection to the cloud server. That is, login is completed. The smart device is in an online state.

If the home account and the smart device are illegal, step S24 is performed: The cloud server sends, to the smart device, a data packet indicating that the home account or the device information of the smart device is wrong. Then step S25 is performed: End this authentication. In this case, the smart device does not complete login, and is in an offline state.

Figure 5:
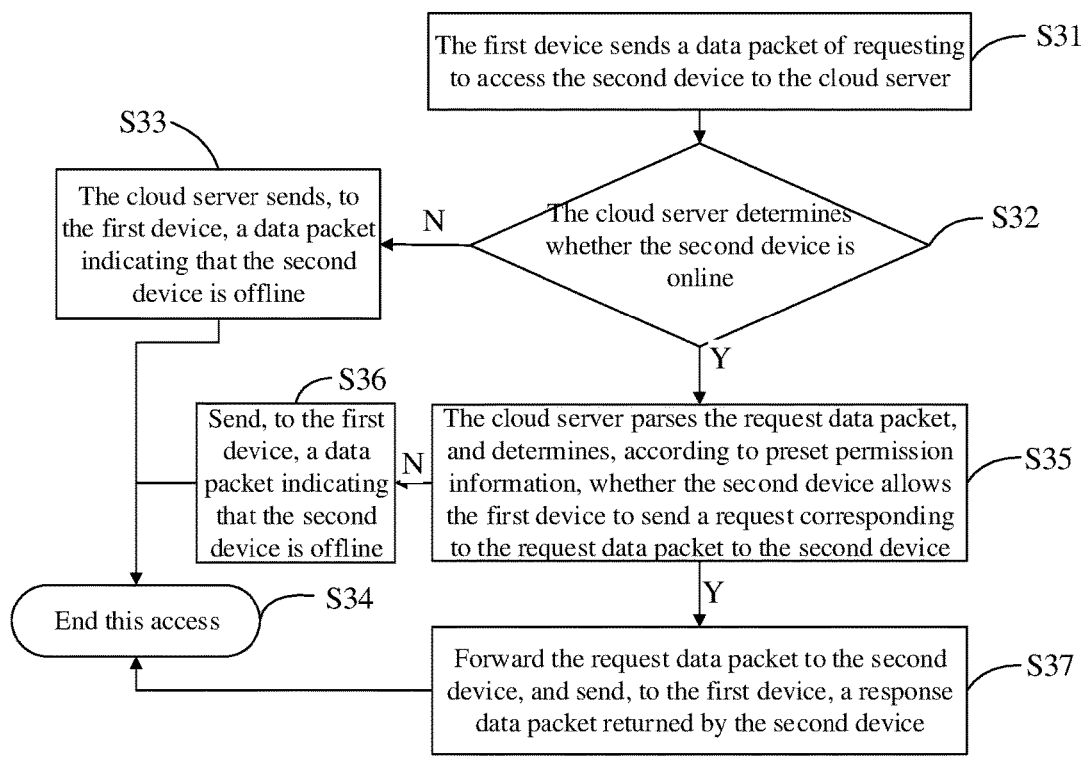
FIG. 5 is a flowchart of an embodiment of mutual access of smart devices according to the present invention.

Further, referring to FIG. 5, FIG. 5 is a flowchart of an embodiment of mutual access of smart devices according to the present invention. The smart devices in the device list include a first device and a second device, and after the establishing, for each of the smart devices, a TCP long connection to the cloud server in step S3, the method further includes:

Step S31: The first device sends a data packet of requesting to access the second device to the cloud server. Then step S32 is performed: The cloud server determines whether the second device is online.

If the second device has not logged in or fails in login, the second device is in an offline state, and in this case, step S33 is performed: The cloud server sends, to the first device, a data packet indicating that the second device is offline. Then step S34 is performed: End this access.

If the second device succeeds in the authentication and has logged in, the second device is in an online state, and in this case, step S35 is performed: The cloud server parses the request data packet, and determines, according to preset permission information, whether the second device allows the first device to send a request corresponding to the request data packet to the second device. If it is allowed, step S37 is performed: After the request data packet is forwarded to the second device, the second device generates a response data packet corresponding to the request data packet and sends the response data packet to the cloud server, and the cloud server sends, to the first device, the response data packet returned by the second device. Then step S34 is performed: End this access. If it is not allowed, step S36 is performed: Send, to the first device, a data packet indicating that the first device has no permission. Then step S34 is performed: End this access.

In this embodiment, a unique home account is created on a cloud server, and smart devices are added under the home account, so that the smart devices log in to the cloud server by using the unified home account, and the smart devices under the unified home account allow mutual access when being authorized, thereby avoiding creating a different account for each smart device in a home, and avoiding that mutual access and message push are allowed only after a friend relationship is established between each two of the smart devices, so that when the smart devices in the home access each other, the workload is greatly reduced. Moreover, a permission management module is established on the cloud server, which limits permissions of sending messages between smart devices under a same home account, and at the same time, particularly limits permissions of sending messages between smart devices under different home accounts, thereby improving the reliability and security of mutual access of the smart devices.

The above descriptions are merely preferred embodiments of the present invention, and are not intended to limit the patent scope of the present invention. Any equivalent modification made to the structure or processes based on the content of this specification and the accompanying drawings for direct or indirect use in other related technical fields shall fall be also encompassed in the patent protection scope of the present invention.

What is claimed is:

1. A system for controlling mutual access of smart devices, comprising a cloud server, wherein the cloud server comprises:
   an information processing module, configured to maintain Transmission Control Protocol (TCP) long connections between smart devices and the cloud server, maintain connection sessions between the smart devices, and forward interaction data packets between the smart devices; wherein the information processing module comprises: a connection, session management and forwarding unit, configured to maintain the TCP long connections between the smart devices and the cloud server, maintain the connection sessions between the smart devices, and forward the interaction data packets between the smart devices; an authenticating unit, configured to authenticate legality of the home account and a smart device; a unit for determining whether a device is online, configured to determine whether the smart device is online; and a permission determining unit, configured to determine whether the smart device has a corresponding access permission;
   an account and device management module, configured to manage registration of a home account, and add smart devices and device information corresponding to the smart devices to a device list under the home account;
   a storage module, connected to the account and device management module and the information processing module, and configured to store the registered home account, the device list under the home account, the smart devices and the device information corresponding to the smart devices; and
   a permission management module, connected to the storage module, and configured to set access permission information corresponding to each of the smart devices.

2. A method for controlling mutual access of smart devices, comprising:
   creating a home account on a cloud server, and adding smart devices and device information corresponding to the smart devices to a device list under the home account;
   acquiring, for each of the smart devices, authentication by using the home account and device information corresponding to the smart device; and
   establishing, for each of the smart devices, a Transmission Control Protocol (TCP) long connection to the cloud server.

3. The method for controlling mutual access of smart devices according to claim 2, wherein the acquiring, for each of the smart devices, authentication by using the home account and device information corresponding to the smart device comprises:
   receiving, by the cloud server, an authentication request sent by the smart device, and determining whether the home account and the smart device are legal, wherein if the home account and the smart device are legal, the smart device returns to the device list.

4. The method for controlling mutual access of smart devices according to claim 3, wherein after the determining whether the home account and the smart device are legal, the method further comprises:
   if the home account and the smart device are illegal, sending, by the cloud server to the smart device, a data packet indicating that the home account or the device information of the smart device is wrong, and ending this authentication.

5. The method for controlling mutual access of smart devices according to claim 2, wherein the smart devices in the device list comprise a first device and a second device, and after the establishing, for each of the smart devices, a TCP long connection to the cloud server, the method comprises:
   sending, by the first device, a data packet of requesting to access the second device to the cloud server, and determining, by the cloud server, whether the second device is online; and
   if the second device is offline, sending, by the cloud server to the first device, a data packet indicating that the second device is offline, and ending this access; or
   if the second device is online, parsing, by the cloud server, the request data packet, and determining, according to preset permission information, whether the second device allows the first device to send a request corresponding to the request data packet to the second device, and if it is allowed, after forwarding the request data packet to the second device, sending, to the first device, a response data packet returned by the second device, and then ending this access; or if it is not allowed, sending, to the first device, a data packet indicating that the first device has no permission, and ending this access.

6. The method for controlling mutual access of smart devices according to claim 5, wherein the adding device information corresponding to the smart devices comprises adding access permission information, device types, device identities (IDs), and device notes that correspond to the smart devices.

7. The method for controlling mutual access of smart devices according to claim 6, wherein access permission information corresponding to each of the smart devices comprises: allowing receiving and sending a command and request, a list of devices whose authorization is allowed, and an effective time range of authorization.

* * * * *